(12) United States Patent
Oks et al.

(10) Patent No.: US 8,890,803 B2
(45) Date of Patent: Nov. 18, 2014

(54) GESTURE CONTROL SYSTEM

(75) Inventors: Eduard Oks, Bat-Yam (IL); Alex Rosen, Tel-Aviv (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 926 days.

(21) Appl. No.: 12/880,282

(22) Filed: Sep. 13, 2010

(65) Prior Publication Data

US 2012/0062453 A1    Mar. 15, 2012

(51) Int. Cl.
*G09G 5/00* (2006.01)
*H04M 1/725* (2006.01)
*G06F 3/01* (2006.01)

(52) U.S. Cl.
CPC .......... *H04M 1/72522* (2013.01); *G06F 3/017* (2013.01); *H04M 2250/52* (2013.01)
USPC ........ 345/156; 345/419; 715/863; 348/14.01; 348/14.02

(58) Field of Classification Search
CPC ....... G06F 3/017; G06F 3/033; G06F 3/0485; G06F 3/048
USPC ........ 345/156, 169; 715/863; 455/420, 556.1; 348/14.01–14.1
See application file for complete search history.

(56) References Cited

U.S. PATENT DOCUMENTS

| | | | |
|---|---|---|---|
| 6,002,808 A | 12/1999 | Freeman | |
| 6,095,989 A * | 8/2000 | Hay et al. | 600/558 |
| 6,266,061 B1 | 7/2001 | Doi | |
| 2004/0189720 A1 | 9/2004 | Wilson | |
| 2004/0190776 A1 | 9/2004 | Higaki | |
| 2006/0093186 A1 | 5/2006 | Ivanov | |
| 2007/0229650 A1* | 10/2007 | McKay | 348/14.01 |
| 2008/0273755 A1 | 11/2008 | Hildreth | |
| 2008/0291160 A1 | 11/2008 | Rabin | |
| 2010/0039378 A1 | 2/2010 | Yabe | |
| 2010/0138797 A1* | 6/2010 | Thorn | 715/863 |
| 2010/0159981 A1 | 6/2010 | Chiang | |
| 2010/0315413 A1* | 12/2010 | Izadi et al. | 345/419 |
| 2011/0119638 A1* | 5/2011 | Forutanpour | 715/863 |
| 2012/0056971 A1* | 3/2012 | Kumar et al. | 348/14.02 |

FOREIGN PATENT DOCUMENTS

| | | |
|---|---|---|
| EP | 0823683 | 2/1998 |
| WO | WO2008/083205 | 7/2008 |
| WO | WO2008/139399 | 11/2008 |
| WO | WO2010/086866 | 8/2010 |

OTHER PUBLICATIONS

XP 025272185, Hands and face tracking for VR applications, Varona et al., Computer & Graphics 29 (2005) 179-187.
European search report for European application serial 11180613.9-2224; mailed Dec. 19, 2011, 10 pages.

* cited by examiner

*Primary Examiner* — Gerald Johnson
(74) *Attorney, Agent, or Firm* — Roach Brown McCarthy & Gruber, P.C.; Kevin D. McCarthy

(57) ABSTRACT

A method for controlling a device comprises: a) providing a mobile device comprising a camera; b) positioning said mobile device such that said camera acquires the image of an operator's hands; c) analyzing the movements of said operator's hands to derive a control command therefrom; and d) transmitting said control command to a controlled device.

12 Claims, 9 Drawing Sheets

GESTURE CONTROL SYSTEM

FIELD OF THE INVENTION

The present invention relates to the use of mobile phones to control external devices. More particularly, the invention relates to the use of a mobile phone camera as part of a system that operates external devices.

BACKGROUND OF THE INVENTION

Many devices are nowadays capable of connecting and exchanging data with mobile devices. As a result, it is now possible to integrate mobile devices as the controlling element of a system that operates such devices.

So far, the art has failed to provide useful applications of mobile phones to display control systems. It is an object of the present invention to provide a system and method that exploits the functionality of mobile phones to provide efficient control means for external devices.

SUMMARY OF THE INVENTION

A method for controlling a device, comprises:
a) providing a mobile device comprising a camera;
b) positioning said mobile device such that said camera acquires the image of an operator's hands;
c) analyzing the movements of said operator's hands to derive a control command therefrom; and
d) transmitting said control command to a controlled device.

In one embodiment of the invention the mobile device is a mobile phone. In another embodiment of the invention the controlled device is integral to the mobile phone, and in a further embodiment of the invention the controlled device is separate from the mobile device.

Different controlled devices can be used in conjunction with the invention, and in one embodiment of the invention the controlled device is a projector.

Control commands can be transmitted from the mobile device to the external device via any suitable channel, e.g., via WiFi.

In another aspect the invention encompasses a system comprising:
A) a controlled device;
B) a mobile device comprising a camera;
C) circuitry for deriving control commands from movements captured by said camera and for transmitting them to the controlled device.

As explained above, the camera and the controlled device can be integral to a mobile device, or separate therefrom.

The invention is further directed to a mobile phone comprising a camera, a projector and circuitry for deriving control commands from movements captured by said camera and for operating said projector therewith.

DETAILED DESCRIPTION OF THE INVENTION

As will be appreciated by the skilled person the invention is not limited to be used with any particular device. However, for the purpose of illustration, in the description to follow reference will be made to a projector at the device that is controlled by the mobile phone.

Modern mobile phones can incorporate a built-in projector (referred to hereinafter as "phone projector") and, therefore, in the example to follow reference will be made to such integrated phone projector. It is however understood by the skilled person, as will be further elaborated in the following description, that the invention is suitable for use also with non-integrated devices, such as when a projector is not integrated within the mobile phone.

Figure 1:
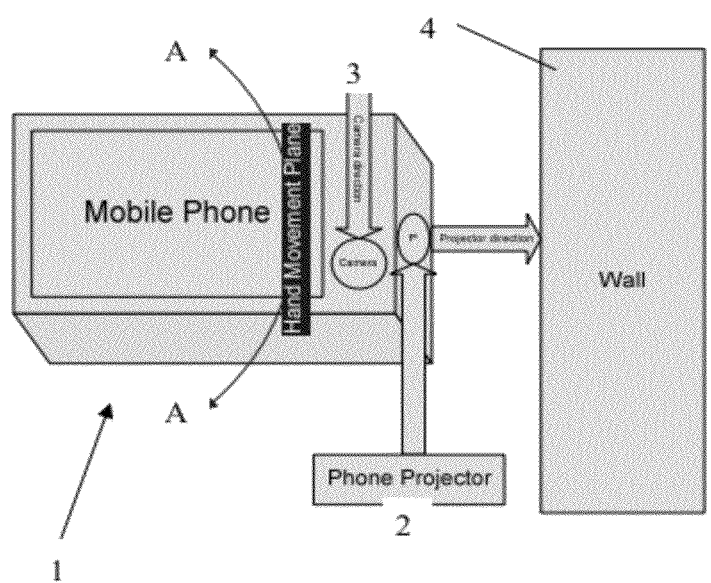
FIG. 1 schematically illustrates a setup in which an integrated mobile phone projector is controlled according to one embodiment of the invention.
Figure 2:
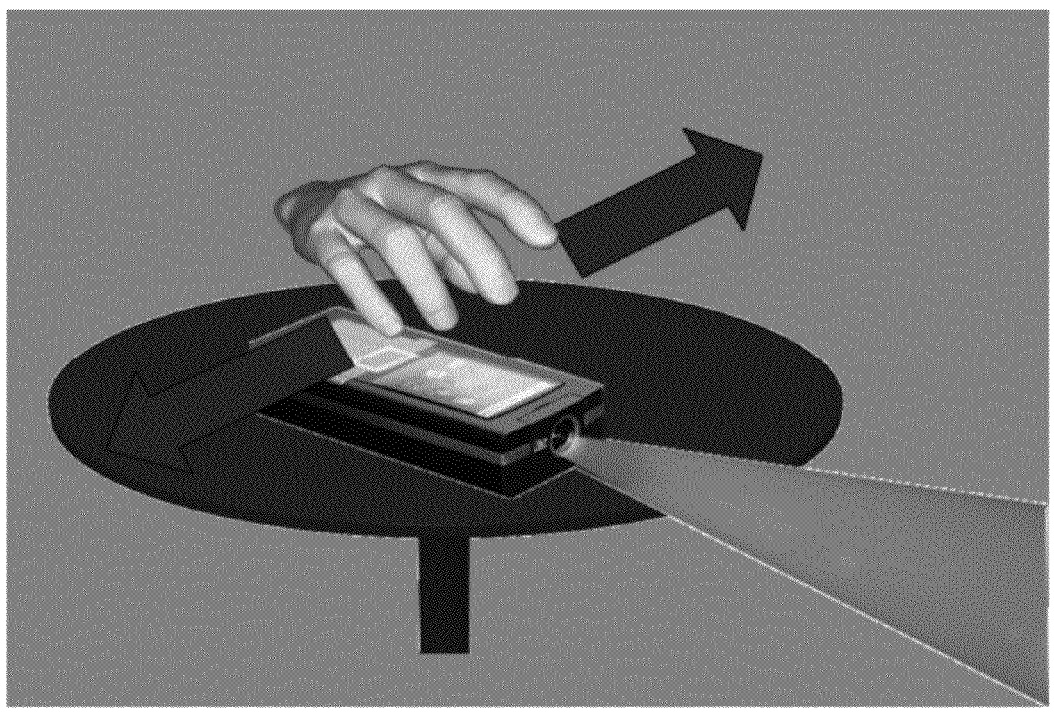
FIG. 2 schematically illustrates a mobile phone setup where an integrated projector is controlled by user hand gestures.
Figure 3:
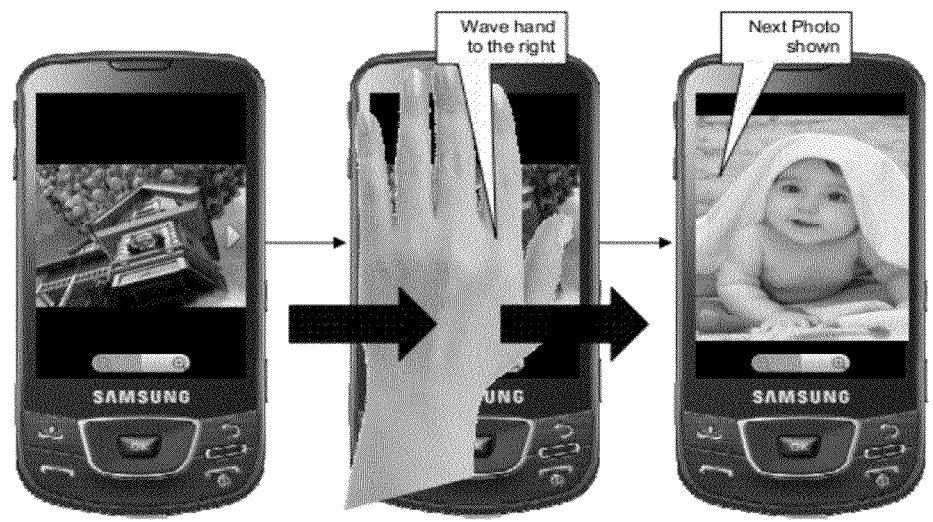
FIG. 3 schematically illustrates a possible photo album application in which a user controls the integrated projector to move the photos with gestures.
Figure 4:
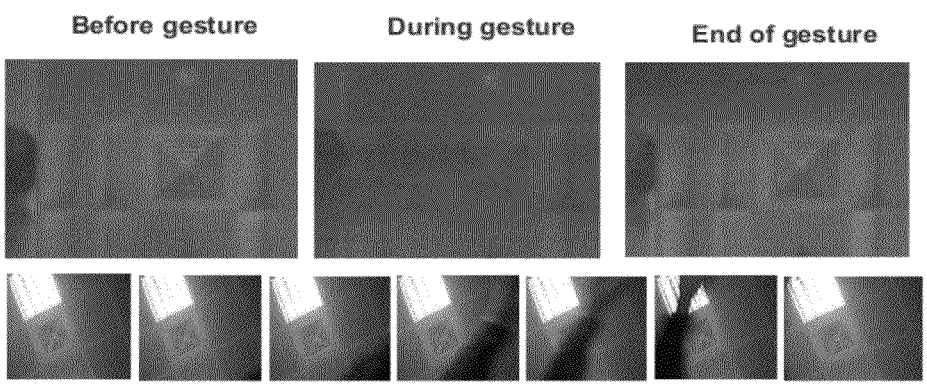
FIG. 4 illustrates how users gestures are viewed in a phone camera preview under different illumination conditions.
Figure 5:
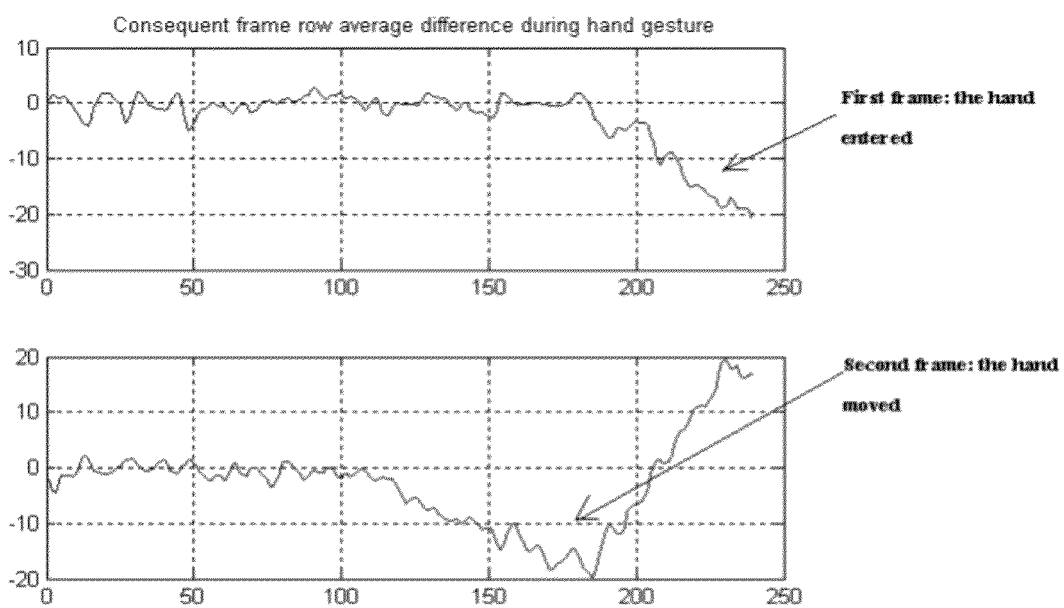
FIG. 5 is a graph showing a waveform caused by a hand gesture as it is calculated from incoming camera frames when they are analyzed in a one-dimensional space.
Figure 6:
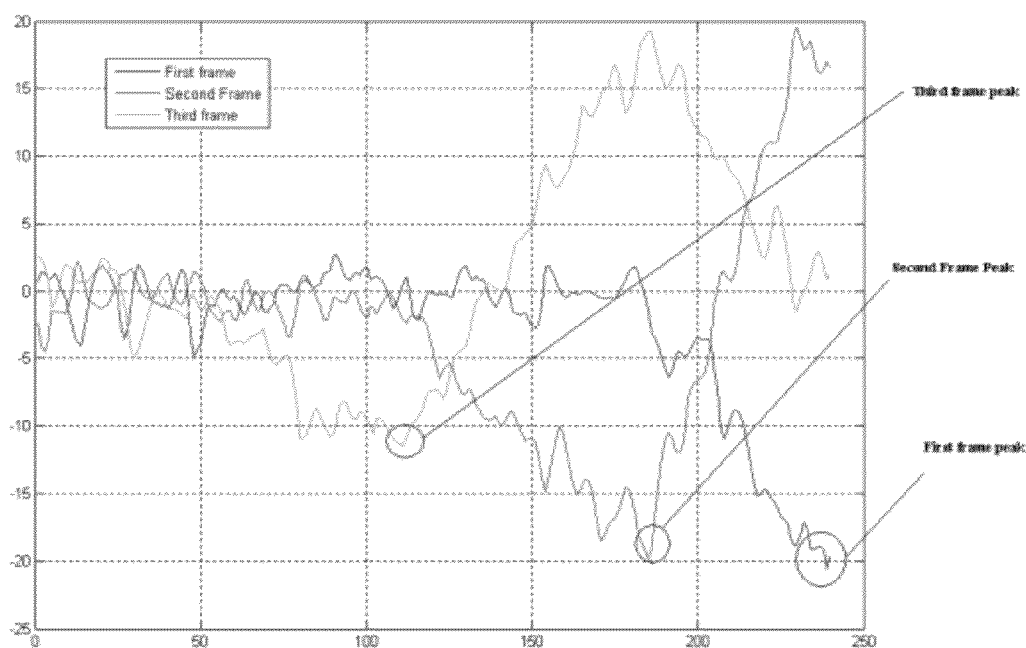
FIG. 6 is a graph showing several consecutive frame waveforms caused by a hand gesture as calculated from incoming camera frames when they are analyzed in a one-dimensional space.
Figure 7:
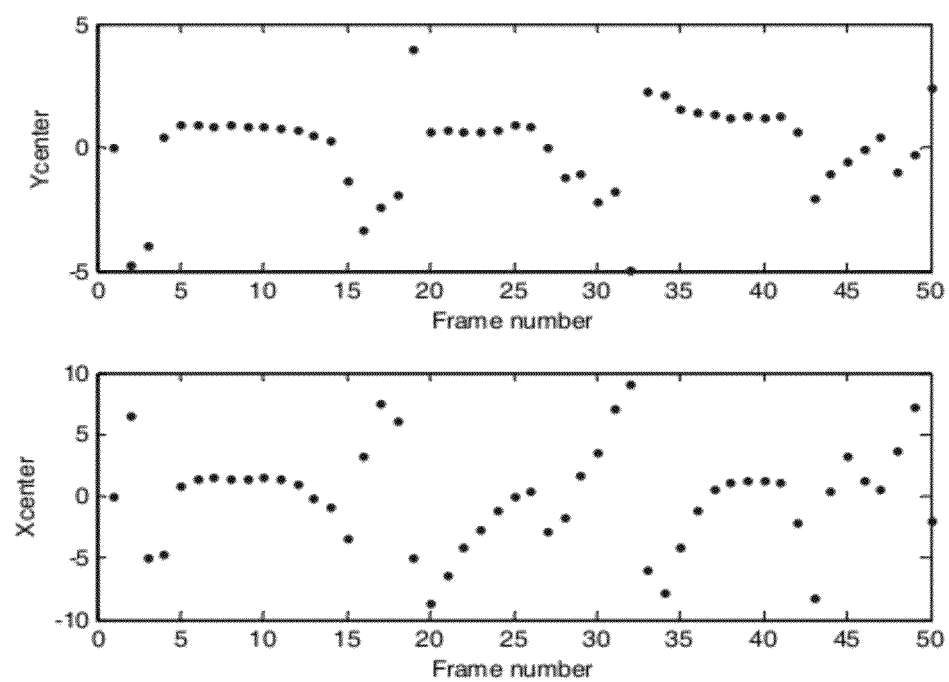
FIG. 7 is a graph showing a center of mass location in the X and Y planes as a function of time and incoming camera frames.
Figure 8:
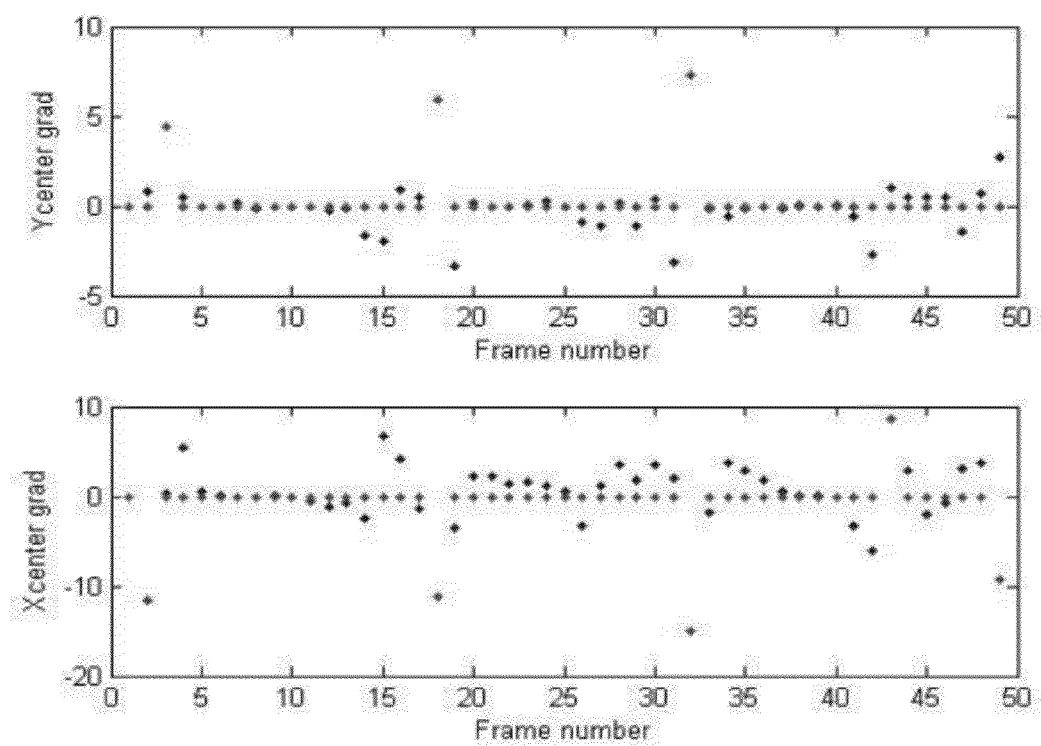
FIG. 8 is a graph showing a filtered (after local extremum extraction) center of mass location in the X and Y planes as a function of time and incoming camera frames.
Figure 9:
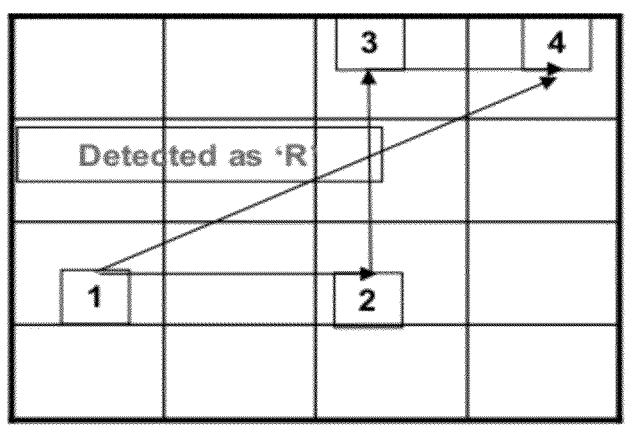
FIG. 9 is an example showing how the center of mass shift in the X and Y planes during the frames sequence is recognized as a gesture.
Figure 10:
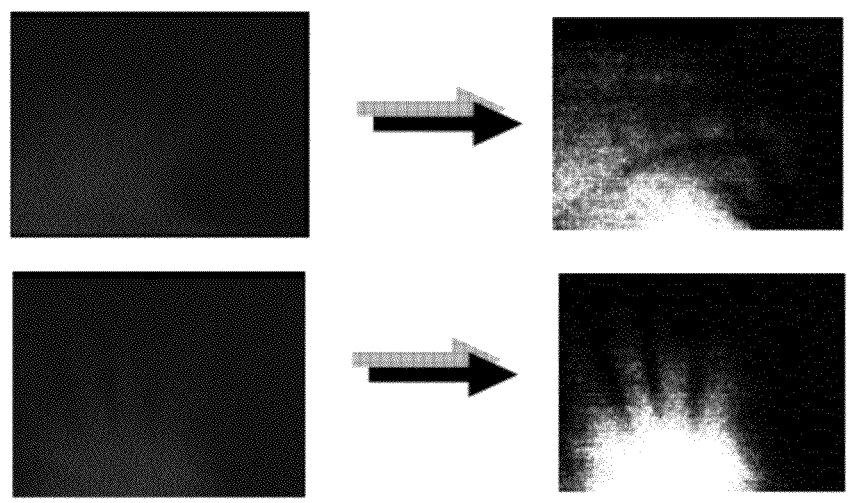
FIG. 10 illustrates the mechanism of background image subtraction used in one embodiment of the invention to enhance contrast in very low light conditions.

Referring now to FIG. 1 a mobile phone 1 is shown, which is provided with an integrated phone projector 2 and an integrated phone camera 3. In the figure the projector is directed against a wall 4, onto which the image projected by the projector will be displayed. When operating according to the invention the mobile phone is positioned such that camera is directed toward the presenter, such that the movements of the presenter's hands takes place essentially in the A-A plane, i.e., above the mobile phone. In another embodiment of the invention the camera may be oriented differently so as to capture hand movements of the presenter, taken from the side of the mobile phone and not above it. As will be appreciated by the skilled person the actual positioned relationship of the mobile phone camera and the presenter's hands may vary according to the different setups.

According to the invention the camera captures the movement of the presenter's hands, which are translated into instructions to the projector. For instance, swiping the hand from right to left may mean "next slide", and from left to right may mean "previous slide".

An additional example is a movie player with virtual button controls. When a user wants to play a movie, he makes with his hands a gesture that is configured to be interpreted as a "Play" command. A camera pointed to the user captures the user's movements and an algorithm engine analyzes the frames captured by the camera. The algorithm engine detects that the user made a gesture that is recognized as pressing a "Play" button with his hand and retrieves the corresponding event to the movie player application. The movie player application then calls initiates the playing of a movie.

As will be appreciated by the skilled person it is important to be able to capture and analyze images in poor light, particularly when operating a projector in relative darkness. This result is made possible by exploiting the capability of the mobile phone camera. The robust algorithm that performs gesture detection task well in poor lighting conditions does so by filtering background noise and detecting the user's hand (or other object held by the user) and its movement pattern/direction. The detection is based on analyzing the one-dimensional signal pattern which is the integrated two-dimensional images in the direction orthogonal to the movement direction. The analysis of signal peaks will retain the gesture detection.

In order to recognize hand gestures in low light, in one embodiment of the invention the following procedure is followed:

1) The user moves his hand in front of the phone camera;
2) The camera captures the frames including the user's hand;
3) The captured frame is passed on to the gesture recognition core engine;
4) The minimum requirement for recognition is two sequential frames that contain a user's hand in them in order to determine the direction of movement;
5) The history of N past frames is stored;
6) When a new frame arrives, it is analyzed and statistics are calculated, such as: average intensity values in each row and columns, and a center of mass of the frame by intensity;
7) The difference in the integral intensity values between two sequential frames is calculated. This calculation is parallel to subtracting the unchanging background;
8) The resulting signal of row and column intensity sum difference is calculated to find a significant peak location;
9) The peak should exceed an adaptive threshold on intensity, which is correlated to the illumination intensity;
10) A correspondence is sought in the direction of peak propagation and the size of the peaks in consecutive frames;
11) Calculate center of mass shift between frames
12) Filter center of mass according to threshold and find local minimum
13) Combine center of mass shift data from X and Y dimensions to detect gesture
14) For detection with center of mass image blocks (2×2, 4×4) are tested independently
15) Detect gesture starting and end point to reduce misdetections
16) If all the conditions are met, the gesture is recognized and reported.

Detection of the gesture in Z axis (vertical)
17) Subtract background from the incoming frame
18) Calculate difference from background frame
19) Use dynamic threshold to detect center of mass shift Detection Criteria:

$$|Sn-A|>D*EnvTh \qquad 1$$

$$|Sn|>BaseTh \qquad 2$$

$$Sn-Sn-1>Sth \text{ (For moving heads cancellation)} \qquad 3$$

Where,
Sn: CoM shift for Frame n
A: CoM shift average
D: Standart deviation of CoM shift
EnvTh: numeric threshold that depends on average frame intensity
BaseTh: constant threshold (different for in gesture frames and out of gesture frames)
Sth: constant threshold for first derivation of the shift Direction Estimation:
1) Compute center of mass global shifts
2) Analyze sign changes in center of mass during gesture to determine what gesture was performed.
3) If there was sign change or the sign hasn't changed but the center of mass shift is above threshold it is Up/Down/Right or Left.
4) Else it is a gesture in Z dimension Features for gesture separation:
1) Center of mass shift sign
2) Total quadratic center of mass shift
3) Center of mass shift direction
4) Gesture duration
5) Number of similar frames
6) Contrast As will be appreciated by the skilled person the invention permits to control other equipment, such as for instance a standalone projector or a computer, as long as connectivity is established between the mobile phone and such equipment. For instance, connection between the cellular phone and equipment can be performed over WiFi, in which case the mobile phone operates as in the above example by "reading" the hand movements of the presenter, but then transmits appropriate commands to the external equipment over WiFi, instead of internally to a built-in device.

The above examples and description have been provided for the purpose of illustration and are not intended to limit the invention in any way. Many different types of mobile devices (e.g., PDAs) provided with the camera can be used, in conjunction with any suitable built-in or external device, without exceeding the scope of the invention.

The invention claimed is:

1. A method for controlling a device by gestures that are detectable even in poor lighting conditions, comprising:
   a) providing a mobile phone comprising a camera;
   b) positioning said mobile phone such that said camera is able to acquire images of an operator's hand;
   c) by said operator, making a hand gesture for initiating a corresponding control signal while at least two sequential frames of images acquired by said camera are analyzed;
   d) processing said at least two sequential frames by a processor of said mobile phone to perform the following operations:
      i) subtracting unchanging background from each of said at least two sequential frames;
      ii) for unsubtracted portions of each of said at least two sequential frames, generating a signal pattern, derived from said hand gesture, of light intensity over time in a uniform direction within each of said at least two sequential frames;
      iii) calculating a location of a frame specific signal peak approximating a center of mass by averaging said signal pattern by integration, wherein said calculated signal peak has a light intensity greater than an adaptive threshold light intensity;
      iv) calculating a center of mass shift between frames; and
      v) when said calculated center of mass shift is indicative of a recognized gesture deriving a control command from said recognized gesture; and
   e) transmitting said control command to a controlled device.

2. The method according to claim 1, wherein the controlled device is integral to the mobile phone.

3. The method according to claim 2, wherein the controlled device is a projector.

4. The method according to claim 1, wherein the controlled device is external to the mobile phone.

5. The method according to claim 4, wherein control commands are transmitted from the mobile phone to the external controlled device via WiFi.

6. The method according to claim 1, wherein the location of the frame specific signal peak is calculated by subdividing the generated signal pattern into a plurality of sections, determining an average light intensity value in each of said sections, and integrating the average light intensity value determined for each of said sections.

7. The method according to claim 6, wherein the uniform direction of the signal pattern is a direction which is orthogonal to a movement direction of the hand gesture.

8. The method according to claim 7, wherein each of the sections is a differential row or column of the generated signal pattern.

9. The method according to claim 8, wherein the location of the frame specific signal peak is calculated by determining an average intensity value in each differential row and column of the generated signal pattern and integrating the average intensity value determined for each of said differential rows and columns.

10. A system for controlling a device by gestures that are detectable even in poor lighting conditions, comprising:
   A) a controlled device;
   B) a mobile device comprising a camera;
   C) circuitry for deriving control commands from movements captured by said camera and for transmitting them to the controlled device;
   wherein said circuitry is operable to:
      i) analyze at least two sequential frames of images acquired by said camera, following performance of a hand gesture for initiating a corresponding control signal;
      ii) subtract unchanging background from each of said at least two sequential frames;
      iii) generate a signal pattern, derived from said hand gesture, of light intensity over time in a direction orthogonal to a movement direction of said hand gesture, for unsubtracted portions of each of said at least two sequential frames;
      iv) calculate a location of a frame specific signal peak approximating a center of mass by averaging said signal pattern by integration, wherein said calculated peak has a light intensity greater than an adaptive threshold light intensity;
      v) calculate a center of mass shift between frames;
      vi) when said calculated center of mass shift is indicative of a recognized gesture, device a control command from said recognized gesture; and
      vii) transmit said control command to a controlled device.

11. The system according to claim 10, wherein the camera and the controlled device are integral to the mobile device.

12. A mobile phone comprising a camera, a projector and circuitry for deriving control commands from movements captured by said camera and for operating said projector therewith;
   wherein said circuitry is operable to:
      i) analyze at least two sequential frames of images acquired by said camera, following performance of a hand gesture for initiating a corresponding control signal;
      ii) subtract unchanging background from each of said at least two sequential frames;
      iii) generate a signal pattern, derived from said hand gesture, of light intensity over time in a direction orthogonal to a movement direction of said hand gesture, for unsubtracted portions of each of said at least two sequential frames;
      iv) calculate a location of a frame specific signal peak approximating a center of mass by averaging said signal pattern by integration, wherein said calculated peak has a light intensity greater than an adaptive threshold light intensity;
      v) calculate a center of mass shift between frames;
      vi) when said calculated center of mass shift is indicative of a recognized gesture, device a control command from said recognized gesture; and
      vii) transmit said control command to a controlled device.

* * * * *